United States Patent Office 3,227,720
Patented Jan. 4, 1966

3,227,720
TETRAHYDROISOQUINOLINE COMPOUNDS
Arnold Brossi, Riehen, and Alfred Rheiner, Jr., Binningen, Switzerland, assignors to Hoffmann-La Roche Inc., Nutley, N.J., a corporation of New Jersey
No Drawing. Filed June 5, 1962, Ser. No. 200,045
Claims priority, application Switzerland, June 29, 1961, 7,608/61
1 Claim. (Cl. 260—289)

The present invention relates to novel tetrahydroisoquinoline compounds. More particularly, it relates to tetrahydroisoquinoline compounds having the formula:

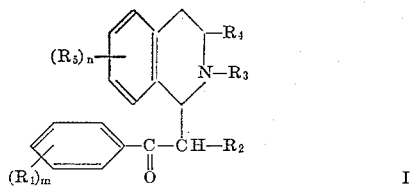

in which $m$ represents 0 or an integer of from 1 to 3, inclusive; in which $n$ represents an integer of from 1 to 3, inclusive; in which $R_1$ represents an alkyl, alkoxy, aralkoxy, hydroxy, nitro, amino, halogen or alkylenedioxy group, the latter alkylenedioxy group being formed by two adjacent $R_1$ substituents; $R_2$ represents hydrogen or a lower alkyl group; $R_3$ represents an alkyl, alkenyl or aralkyl group; $R_4$ represents hydrogen or a lower alkyl group; $R_5$ represents an alkyl, alkoxy, aralkoxy, hydroxy or alkylenedioxy group, the latter alkylenedioxy group being formed by two adjacents $R_5$ substituents;

to acid addition salts of those compounds with medicinally acceptable acids and to processes for the production both of the bases and their acid addition salts.

In the practice of the present invention a dihydroisoquinolinium compound having the formula

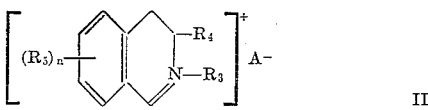

in which $A^-$ represents an anion and the symbols $R_3$, $R_4$, $R_5$ and $n$ have the same meanings as in Formula I is condensed with a ketone having the formula

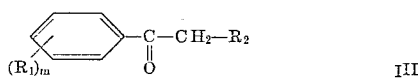

in which the symbols $R_1$, $R_2$ and $m$ have the same meaning as in Formula I in the presence of a basic condensation agent. If desired, the tetrahydroisoquinoline compound, thus obtained, can be converted into an acid addition salt by reaction with a medicinally acceptable acid.

The alkyl groups which are represented in the foregoing formulas by the symbols $R_1$, $R_3$ and $R_5$ are, for example, lower alkyl groups, such as, methyl, ethyl, isopropyl, butyl, heptyl groups, etc. The alkyl groups which are represented in the foregoing formulas by the symbols $R_2$ and $R_4$ are lower alkyl groups, preferably, alkyl groups having from 1 to 4 carbon atoms. Examples of the alkoxy groups which, in foregoing formulas, are represented by the symobls $R_1$ and $R_5$ are lower alkoxy groups, such as, methoxy, ethoxy, propoxy, butoxy groups, etc. As examples of the aralkoxy groups represented by the symbols $R_1$ and $R_5$, benzyloxy and phenethyloxy groups can be mentioned. The alkylenedioxy groups which are represented in the foregoing formulas by the symbols $R_1$ and $R_5$, are, for example, methylenedioxy and ethylenedioxy groups. Where the symbol $R_1$ represents halogen, the substituent can be, for example, fluorine, chlorine or bromine. Vinyl, allyl, methallyl, dimethallyl, etc. and benzyl, phenethyl, etc. are examples of the alkenyl and aralkyl groups, respectively, which are represented by the symbol $R_3$. The symbol $A^-$ in Formula II represents, preferably, a halogen anion, such as, chlorine, bromine or iodine anion or an alkyl sulfate anion, such as methyl sulfate anion or ethyl sulfate anion.

The dihydroisoquinolinium compounds of Formula II can be obtained readily by treating the corresponding 3,4-dihydroisoquinoline compound with a suitable quaternizing agent. Suitable quaternizing agents are, for example, alkyl halides, such as methyl iodide, methyl bromide, ethyl iodide, etc., or dialkyl sulfates, such as dimethyl sulfate, diethyl sulfate, etc. Alkenyl halides, such as, vinylchloride, allyl bromide, etc., or aralkyl halides, such as, benzyl bromide or phenethyl bromide are other classes of quaternizing agents suitable for use. The quaternization is carried out conveniently in an organic solvent, such as, ethyl acetate. A suitable procedure comprises allowing an ethyl acetate solution of the 3,4-dihydroisoquinoline to stand at room temperature, or at a slightly higher temperature, in contact with an equivalent quantity of quaternizing agent. The quaternary dihydroisoquinolinium compounds, substituted in the 2-position by an alkyl, alkenyl or aralkyl group, precipitate out as a rule and form mostly crystalline substances which are soluble in water.

The 3,4-dihydroisoquinoline compounds which are quarternized to obtain the dihydroisoquinolinium starting materials for this invention are, in part, known compounds which are prepared by known methods. One such method for producing these 3,4-dihydroisoquinoline compounds comprises, for example, converting a suitably substituted β-phenethylamine into the formamide and cyclizing the compound, thus obtained, by the Bischler-Napieralski method. (cf. R. C. Elderfield, Heterocyclic Compounds, vol. IV, page 348, New York, 1952, as well as J. M. Gulland and C. J. Virden, J. Chem. Soc., 1929, page 1797). Furthermore, the compound can be prepared by the reaction of alkenylbenzenes, having an ethylene linkage in conjugation to the aromatic nucleus, with imido halogenides (cf. M. Lora-Tamayo and R. Madroñero, Festschrift Prof. Arthur Stoll, page 220 [Birkhauser, Basel, 1957]) or they can be obtained by the reaction of a 2-(β-bromoalkyl)-benzaldehyde with ammonia or hydroxylamine with subsequent reduction of the N-oxide. (E. Schmitz, Chem. Berichte 91, 1488 [1958].)

In the practice of the present invention, the compound of Formula II is condensed with the compound of Formula III in the presence of a basic condensation agent. Such condensation agents are, for example, alkalis such as alkali metal hydroxides, that is, sodium hydroxide, potassium hydroxide, etc.; and alkali metal alcoholates, for example, sodium methylate. Also, organic bases, such as, dimethylamine, triethylamine, piperidine, pyridine, etc. can be used as the condensation agent. It is advisable to carry out the reaction in an organic solvent, for example, in an alcohol, such as methanol, ethanol or in a cyclic ether, such as dioxane, tetrahydrofuran, etc., or in a mixture of such solvents with water.

A preferred method for carrying out the invention comprises mixing together equivalent amounts of the compounds of Formula II and Formula III, dissolved in a lower alcohol, such as, methanol, and mixing the solution, thus obtained, with about one equivalent of dilute, aqueous, for example, 3 N, sodium hydroxide. The solution is then allowed to stand for a few hours at room temperature. To accelerate the reaction, however, the condensation can be carried out also at a slightly higher temperature, for example, at a temperature up to about 50° C. After evaporation of the solvent, the condensation product is worked up by conventional methods.

Those tetrahydroisoquinoline compounds of Formula I, in which the symbols $R_2$ and $R_4$ represent hydrogen, contain an asymmetrical carbon atom and, in the practice of the present invention, they will be obtained in the form of racemates. These racemic mixtures can be separated into their optical antipodes by methods known per se, for example, by fractional crystallization of the salts with optically active acids, such as, d-tartaric acid, dibenzoyl-d-tartaric acid or d-camphor-sulfonic acid. Where one of the symbols $R_2$ or $R_4$ represents a lower alkyl group, the number of theoretical stereoisomeric racemates amounts to two. Where both of the symbols $R_2$ and $R_4$ represent lower alkyl groups, the number of theoretical stereoisomeric racemates amounts to four.

The reaction products obtained are basic, mostly crystalline substances which form crystalline, water-soluble salts when reacted with conventional inorganic acids, for example, sulphuric acid, phosphoric acid, hydrohalic acids, such as hydrochloric acid, hydrobromic acid; or organic acids, for example, tartaric acid, malic acid, citric acid, succinic acid, etc. These salts crystallize as a rule with varying quantities of water of crystallization.

The bases of Formula I, as well as the acid addition salts thereof, possess valuable pharmaceutical properties, for example, analgesic and antitussive properties. They can, therefore, be employed as medicaments, for example, in the form of pharmaceutical preparations. These products, that is, both the bases and the acid addition salts thereof, can be used as such, or in admixture with other compounds, and they can be embodied in a form suitable for enteral or parenteral administration. For example, the present products can be mixed with inert adjuvants, either inorganic or organic in nature, such as, water, gelatin, lactose, starch, magnesium stearate, talc, vegetable oils, gums, polyalkylene glycols, Vaseline, etc. These pharmaceutical preparations can be provided in form of tablets, dragees, suppositories, or they can be incorporated in suitable capsules. Additionally, they may be provided in liquid form, for example, as solutions, suspensions or emulsions. If desired, the products can be sterilized and/or mixed with adjuvant materials, such as, preservatives, stabilizers, wetting or emulsifying agents, salts for altering osmotic pressure or buffers. If desired, they can be used also in admixture with other therapeutically valuable substances.

The reaction produces are, furthermore, valuable intermediates which are useful in the synthesis of other therapeutical active compounds.

For a fuller understanding of the nature and objects of the invention, reference may be had to the following examples which are given merely as further illustrations of the invention and are not to be construed in a limiting sense.

Example 1

18 grams of 2-methyl-6,7-dimethoxy-3,4-dihydroisoquinolinium methyl sulfate (melting point 157° C.; prepared from 6,7-dimethoxy-3,4-dihydroisoquinoline and dimethylsulfate in ethyl acetate solution) and 10 grams of p-chloroacetophenone were dissolved in 200 ml. of methanol. To this solution there was added 17 ml. of 3 N sodium hydroxide following which the solution was allowed to stand at room temperature for 24 hours. After concentration in a water jet vacuum, the reaction mixture was mixed with dilute hydrochloric acid, until acid in reaction to Congo red, and it was then shaken with ether to remove the neutral portion. The aqueous acid salt solution was then made alkaline by the addition of soda solution. The product which precipitated from solution, was recovered by filtration, dried at room temperature over phosphorous pentoxide and crystallized from an ethyl acetate-petroleum ether mixture.

There was obtained 17.0 grams of 1-(p-chlorophenacyl) - 2 - methyl - 6,7 - dimethoxy - 1,2,3,4 - tetrahydroisoquinoline having a melting point at 106°–107° C. This product, in acetone, and upon addition of alcoholic hydrochloric acid thereto, was converted into the corresponding hydrochloride salt melting at 151°–152° C.; U.V. spectrum, in ethanol, exhibited maxima at 256 and 283 (shoulder) m$\mu$; $\epsilon$=18,500 and 5,680.

In an analagous manner there was prepared:

By the reaction of 2-methyl-6,7-dimethoxy-3,4-dihydroisoquinolinium methyl sulfate with acetophenone: 1-phenacyl - 2 - methyl - 6,7 - dimethoxy - 1,2,3,4 - tetrahydroisoquinoline having a melting point of 80°–81° C.

By the reaction of 2-methyl-6,7-dimethoxy-3,4-dihydroisoquinolinium iodide (melting point 210°–211° C.) with p-nitro-acetophenone: 1-(p-nitrophenacyl)-2-methyl-6,7-dimethoxy-1,2,3,4-tetrhydroisoquinoline having a melting point of 120° C. The hydrochloride salt of the base melted at 173°–174° C.

By the reaction of 2-methyl-6,7-dimethoxy-3,4-dihydroisoquinolinium methyl sulfate with 3,4-dimethoxyacetophenone: 1 - (3,4 - dimethoxyphenacyl) - 2 - methyl-6,7-dimethoxy-1,2,3,4-tetrahydroisoquinoline. The hydrochloride salt of this base melted at 120° C.

By the reaction of 2-methyl-6,7,8-trimethoxy-3,4-dihydroisoquinolinium iodide (melting point 184°–185° C.) with chloracetophenone: 1-(p-chlorophenacyl)-2-methyl-6,7,8-trimethoxy-1,2,3,4-tetrahydroisoquinoline. The hydrochloride salt of this base melted at 120°–121° C.

By the reaction of 2-methyl-6,7-methylenedioxy-8-methoxy-3,4-dihydroisoquinolinium chloride with p-nitroacetophenone: 1-(p-nitrophenacyl)-2-methyl-6,7-methylenedioxy-8-methoxy-1,2,3,4-tetrahydroisoquinoline melting at 155°–156° C.

By the reaction of 2-methyl-6,7-methylenedioxy-8-methoxy-3,4-dihydroisoquinolinium chloride with 3,4-dimethylacetophenone: 1 - (3,4 - dimethylphenacyl) - 2-methyl - 6,7 - methylenedioxy - 8-methoxy - 1,2,3,4-tetrahydroisoquinoline. The hydrochloride salt of this base melted at 186°–188° C.

By the reaction of 2-methyl-6,7-methylenedioxy-8-methoxy-3,4-dihydroisoquinolinium chloride and p-chloracetophenone: 1-(p-chlorphenacyl)-2-methyl-6,7-methylenedioxy-8-methoxy-1,2,3,4-tetrahydroisoquinoline having a melting point of 113° C. The hydrochloride salt of this base melted at 184° C.

By the reaction of 2-methyl-6,7,8-trimethoxy-3,4-dihydroisoquinolinium iodide and 3,4-dimethoxyacetophenone: 1 - (3,4 - dimethoxyphenacyl) - 2 - methyl - 6,7,8-trimethoxy-1,2,3,4-tetrahydroisoquinoline. The hydrochloride salt of this base melted at 157°–158° C.

By the reaction of 2-methyl-6,7-dimethoxy-3,4-dihydroisoquinolinium methyl sulfate and 3,4-dichloracetophenone: 1-(3,4-dichlorophenacyl)-2-methyl-6,7-dimethoxy-1,2,3,4-tetrahydroisoquinoline having a melting point of 147°–149° C.

By the reaction of 2,3-dimethyl-6,7-dimethoxy-3,4-dihydroisoquinolinium methyl sulfate (isolated as an oily substance when 3-methyl-6,7-dimethoxy-3,4-dihydroisoquinoline is treated with dimethyl sulfate in ethyl acetate) and p-chloracetophenone: 1-(p-chlorophenacyl)-2,3-dimethyl-6,7-dimethoxy-1,2,3,4-tetrahydroisoquinoline melting at 118°–119° C.

By the reaction of 2-methyl-6,7-dimethoxy-3,4-dihydroisoquinolinium methyl sulfate and p-hydroxyacetophenone: 1-(p-hydroxyphenacyl-2-methyl-6,7-dimethoxy-1,2,3,4-tetrahydroisoquinoline having a melting point at 147°–148° C.

By the reaction of 2-methyl-6,7-dimethoxy-3,4-dihydroisoquinolinium methyl sulfate and p-methoxyacetophenone: 1 - (p - methoxyphenacyl) - 2 - methyl - 6,7-dimethoxy-1,2,3,4-tetrahydroisoquinoline having a melting point of 91°–92° C. The hydrochloride salt of this base melted at 120° C.

By the reaction of 2-methyl-6,7-dimethoxy-3,4-dihydroisoquinolinium methyl sulfate and p-methylacetophenone: 1 - (p - methylphenacyl - 2 - methyl - 6,7 - dimethoxy-1,2,3,4-tetrahydoisoquinoline melting at 115°–116° C.

By the reaction of 2-methyl-6,7-dimethoxy-3,4-dihydroisoquinolinium methyl sulfate and 2-ethyl-4,5-dimethoxyacetophenone (the latter melting at 62° C., recrystallized from isopropyl ether and petroleum ether; prepared from 1-ethyl-3,4-dimethoxy benzene and acetyl chloride by the Friedel-Crafts method): 1-(2-ethyl-4,5-dimethoxyphenacyl) - 2 - methyl - 6,7 - dimethoxy - 1,2,3,4 - tetrahydroisoquinoline melting at 110°–111° C.

From 2 - methyl - 6 - benzyloxy - 7 - methoxy - 3,4-dihydroisoquinolinium methyl sulfate (melting point 142°–144° C.; prepared from 3-benzyloxy-4-methoxyphenethylamine through its formamide, the latter being cyclized to yield the 3,4-dihydroisoquinoline compound, the oxalate salt of which melted at 184° C., with decomposition, followed by the quaternization of the 3,4-dihydroisoquinoline compound with dimethyl sulfate) and p-chloroacetophenone: 1-(p-chlorophenacyl)-2-methyl-6-benzyloxy-7-methoxy-1,2,3,4-tetrahydroisoquinoline melting at 92°–93° C.

From 2-allyl-6,7-dimethoxy-3,4-dihydroisoquinolinium bromide (melting point 166°–167°C.; prepared from 6,7-dimethoxy-3,4-dihydroisoquinoline and allyl bromide) and p-chloroacetophenone: 1-(p-chlorophenacyl)-2-allyl-6,7-dimethoxy-1,2,3,4-tetrahydroisoquinoline melting at 71°–72° C.

We claim:

1 - (p - chlorophenacyl) - 2 - methyl-6,7-dimethoxy-1,2,3,4-tetrahydroisoquinoline.

References Cited by the Examiner

UNITED STATES PATENTS

| 2,651,634 | 9/1953 | Henecka | 260—285.5 |
| 2,651,637 | 9/1953 | Henecka | 260—289.5 X |

OTHER REFERENCES

Ahluwalia et al.: Chem. Abs., volume 27, column 4804 (1933).

Brossi et al.: Helv. Chem. Acta., vol. 43, pp. 1459–1472, p. 1472 relied upon (1960).

Eckhart: Chem. Abstracts, vol. 56, col. 15557 (1962); abstracting Magyar Kem. Folyorat, vol. 67, pp. 509–11 (1961).

Elderfield: Heterocyclic Compounds, vol. 4, pp. 454 and 465 (1952).

Kondo et al.: Chem. Abs., volume 24, column 4043 (1930).

Oberlin: Chem. Abs., volume 21, columns 1989–90 (1927).

Schlittler et al.: Chem. Abs., volume 44, columns 2533–35 (1950).

Schopf et al.: Angew Chem., volume 69, pages 391–2 (1957).

NICHOLAS S. RIZZO, *Primary Examiner.*

DUVAL T. McCUTCHEN, *Examiner.*